(12) United States Patent
Godbaz (10) Patent No.: US 11,500,100 B2
(45) Date of Patent: Nov. 15, 2022

(54) TIME-OF-FLIGHT MEASUREMENTS USING LINEAR INVERSE FUNCTION

(71) Applicant: Microsoft Technology Licensing, LLC, Redmond, WA (US)

(72) Inventor: John Peter Godbaz, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 884 days.

(21) Appl. No.: 16/384,830

(22) Filed: Apr. 15, 2019

(65) Prior Publication Data
US 2020/0326426 A1 Oct. 15, 2020

(51) Int. Cl.
G01S 17/89 (2020.01)
G01S 17/26 (2020.01)
G01S 17/86 (2020.01)
G01S 7/40 (2006.01)

(52) U.S. Cl.
CPC ............... G01S 17/89 (2013.01); G01S 7/40 (2013.01); G01S 17/26 (2020.01); G01S 17/86 (2020.01)

(58) Field of Classification Search
CPC .......... G01S 17/89; G01S 17/26; G01S 17/86; G01S 7/40
See application file for complete search history.

(56) References Cited

U.S. PATENT DOCUMENTS

| | | | |
|---|---|---|---|
| 4,915,498 A * | 4/1990 | Malek | G01S 17/89 367/901 |
| 7,936,449 B1 | 5/2011 | Bamji et al. | |
| 8,274,037 B2 * | 9/2012 | Ritter | G01S 17/08 250/214 R |
| 8,482,722 B2 * | 7/2013 | Min | G01S 17/36 356/5.1 |
| 9,681,123 B2 | 6/2017 | Perry et al. | |

(Continued)

FOREIGN PATENT DOCUMENTS

WO 2013010913 A1 1/2013

OTHER PUBLICATIONS

"Final Office Action Issued in U.S. Appl. No. 14/245,751", dated May 20, 2016, 9 Pages.

(Continued)

*Primary Examiner* — Peter M Bythrow
(74) *Attorney, Agent, or Firm* — Alleman Hall Creasman & Tuttle LLP (57) ABSTRACT

One example provides a time-of-flight depth imaging system configured to modulate light emitted from a light source to illuminate an environment with modulated light, and for each of one or more modulation frequencies, integrate an image at each phase step of a plurality of phase steps, and sense a temperature of the light source and/or image sensor via one or more temperature sensors to acquire a measured temperature. The instructions are further executable to, and for each pixel of one or more pixels of the image sensor, determine a complex phasor based upon the measured temperature using a linear inverse function for each modulation frequency, determine a phase shift between the light emitted from the light source and light from the light source reflected back by the environment based on the complex phasor, and output a depth value for the pixel based upon the phase shift.

20 Claims, 9 Drawing Sheets

(56) References Cited

U.S. PATENT DOCUMENTS

| | | | |
|---|---|---|---|
| 2005/0111498 A1* | 5/2005 | Daiber | H01S 5/0612 372/20 |
| 2008/0007709 A1* | 1/2008 | Bamji | G01C 25/00 356/5.01 |
| 2008/0309914 A1 | 12/2008 | Cantin et al. | |
| 2009/0240455 A1* | 9/2009 | Fromme | G01K 11/32 702/85 |
| 2010/0123895 A1* | 5/2010 | Reiner | G01V 8/12 372/9 |
| 2011/0292370 A1* | 12/2011 | Hills | G01S 17/36 356/5.01 |
| 2012/0013887 A1* | 1/2012 | Xu | G01S 17/894 356/4.02 |
| 2012/0092485 A1* | 4/2012 | Meinherz | G01S 7/4802 348/91 |
| 2012/0315965 A1 | 12/2012 | Bathiche | |
| 2014/0160459 A1 | 6/2014 | Huber et al. | |
| 2015/0117869 A1* | 4/2015 | Wakayama | H04B 10/5053 398/185 |
| 2015/0253417 A1* | 9/2015 | Patil | G01S 7/497 356/5.01 |
| 2015/0288955 A1* | 10/2015 | Perry | G01S 7/497 348/187 |

OTHER PUBLICATIONS

"Non Final Office Action Issued in U.S. Appl. No. 14/245,751", dated Jan. 25, 2016, 8 Pages.

Fuchs, et al., "Extrinsic and Depth Calibration of ToF-Cameras", In IEEE Conference on Computer Vision and Pattern Recognition, Jun. 23, 2008, 6 Pages.

"International Search Report and Written Opinion Issued in PCT Application No. PCT/US2020/024798", dated Jun. 22, 2020, 12 Pages.

* cited by examiner

TIME-OF-FLIGHT MEASUREMENTS USING LINEAR INVERSE FUNCTION

BACKGROUND

Time-of-flight depth sensors may utilize a phase shift method to measure distances. In such examples, a periodically modulated laser beam is emitted toward a target object, reflected light is received at an image sensor, and, for each pixel of the image sensor, the phase of the received light is compared with that of the emitted light. A depth (distance) from each pixel of the time-of-flight sensor to the target object can then be determined based on the phase shift.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to mitigating the effects of temperature on components of a time-of-flight depth sensing system. One example provides a time-of-flight depth imaging system comprising a modulated time-of-flight image sensor, a light source, and one or more temperature sensors configured to sense a temperature of the light source and/or image sensor. The example further comprises a processor, and a storage device comprising instructions executable by the processor to modulate light emitted from the light source to illuminate an environment with modulated light, and for each of one or more modulation frequencies, integrate an image at each phase step of a plurality of phase steps and sense the temperature of the light source and/or image sensor via the one or more temperature sensors to acquire a measured temperature. The instructions are further executable to, for each pixel of one or more pixels of the image sensor, determine a complex phasor based upon the measured temperature using a linear inverse function for each modulation frequency, determine a phase shift between the light emitted from the light source and light from the light source reflected back by the environment based on the complex phasor, and output a depth value for the pixel based upon the phase shift.

DETAILED DESCRIPTION

Amplitude Modulated Continuous Wave (AMCW) Time-of-Flight (ToF) depth sensing systems work by illuminating a scene with modulated light and measuring the time taken for the light to travel to objects in the scene and back to the sensor. The sensor works by correlating the backscattered light with a reference modulation signal, enabling measurement of the phase offset induced in the modulated waveform and inferring the time taken for the light to travel, thus calculating the distance to objects. Because there is an ambiguity in the distance measured due to phase wrapping, it is typical to use multiple modulation frequencies to increase the maximum unambiguous range. There are detailed descriptions of such systems in the literature.

AMCW ToF sensing systems may operate at high peak laser powers to overcome the amount of background ambient light in some environments, such as outdoor spaces or interior spaces with bright lighting. To further reduce noise from background light, it may be desirable to emit the total laser energy for an image frame within a short period of time to limit an amount of ambient light that is integrated. The use of a high-powered laser light source may help to achieve short integration times. However, the phases and amplitudes of light emitted by such high-powered light sources may be sensitive to the light source temperature. This may result in errors on the order of centimeters in sensed depth values in time-of-flight sensing systems that calculate the phase based on Discrete Fourier Transform (DFT) bins of the phase measurements. For example, as the laser light source heats up within a frame during a series of phase steps, the electro-optical properties of a first phase step, such as peak optical power output, threshold current and mean phase, may vary from that of a second or third phase step. Ambient temperature may further affect such electro-optical properties. An image sensor used to integrate the reflected light also may have spatial temperature dependencies that vary as a function of pixel location on the image sensor, further complicating accurate depth measurement.

Various methods may be used to mitigate errors arising from such temperature sensitivities. One possible solution may be to maintain the light source at a substantially constant temperature during depth sensing. However, hardware for maintaining the temperature may be unsuitably bulky and/or expensive for many real-world systems. As another possible solution, a time-of-flight depth sensing system may use a per-pixel linear correction after conversion to a depth value. However, such methods may be applied late in a depth image data processing pipeline after phase unwrapping, resulting in a degradation in performance. Further, such per-pixel linear corrections may not address spatial temperature dependencies of the image sensor.

Accordingly, examples are disclosed that relate to calibrating such temperature dependencies of the light source and image sensor in a time-of-flight imaging system for accurate depth sensing. Briefly, rather than using Fourier Transform-based methods to process the depth data, the disclosed examples use a linear inverse approach to determine a complex phasor for each sample acquired at each light source modulation frequency. As explained in more detail below, the phase and amplitude can be arbitrary using the disclosed example linear inverse approach, in contrast with Fourier Transform-based approaches. The disclosed examples may help to achieve millimeter-level accuracy across a wide temperature range (e.g. from 10° to 80° Celsius), depending upon calibration temperatures used.

Figure 1:
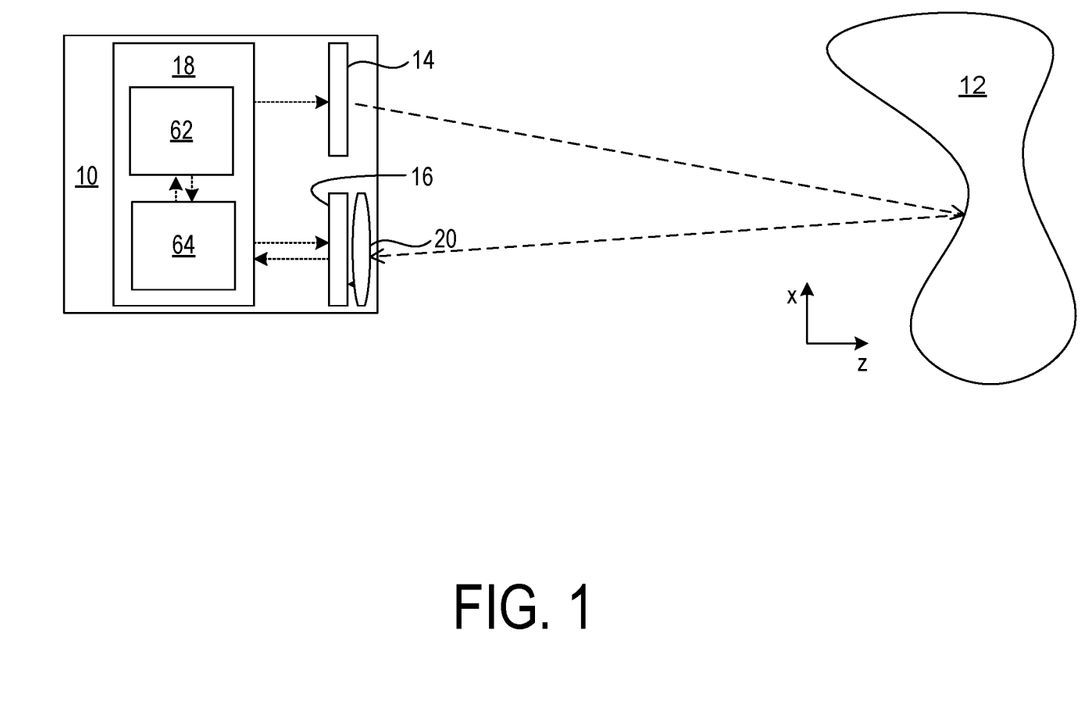
FIG. 1 shows a block diagram of an example time-of-flight depth imaging system.

FIG. 1 shows an example time-of-flight depth sensing system 10 configured to image a target 12. Depth camera 10 includes a modulated light source 14, an imaging array 16, and a controller 18. The depth camera may also include various other components, such as an imaging lens 20 and/or wavelength filter, which may be set in front of the array.

Modulated light source 14 is configured to irradiate target 12 with amplitude modulated light of sinusoidal, rectangular or any other shape. The modulated light source may include one or more suitable laser light sources, such as LEDs, VCSELs or edge-emitting lasers.

Imaging array 16 includes an array of depth-sensing pixels. The imaging array is configured to receive pulsed or modulated probe light reflected back from target 12. Each pixel of the array is configured to present an output signal dependent on distance from the depth camera to the locus of target 12 imaged onto that pixel.

Continuing with FIG. 1, controller 18 includes a logic subsystem 62 and a storage subsystem 64. Controller 18 includes logic to provide modulated drive signals to light source 14 and to a modulated imaging array 16 to synchronize the operation of these components. The imaging array 16 works by correlating the incident light with a reference waveform which can be varied for each measurement and storing the correlated value within each pixel. The value stored for a particular illumination and sensor modulation waveform combination may be referred to as an integration. The controller is also configured to read the output signal from each pixel of the imaging array to enable computation of a depth map of target 12. In some embodiments, repeated depth imaging may be used to assemble a time-resolved series of depth maps (a depth video).

Figure 2:
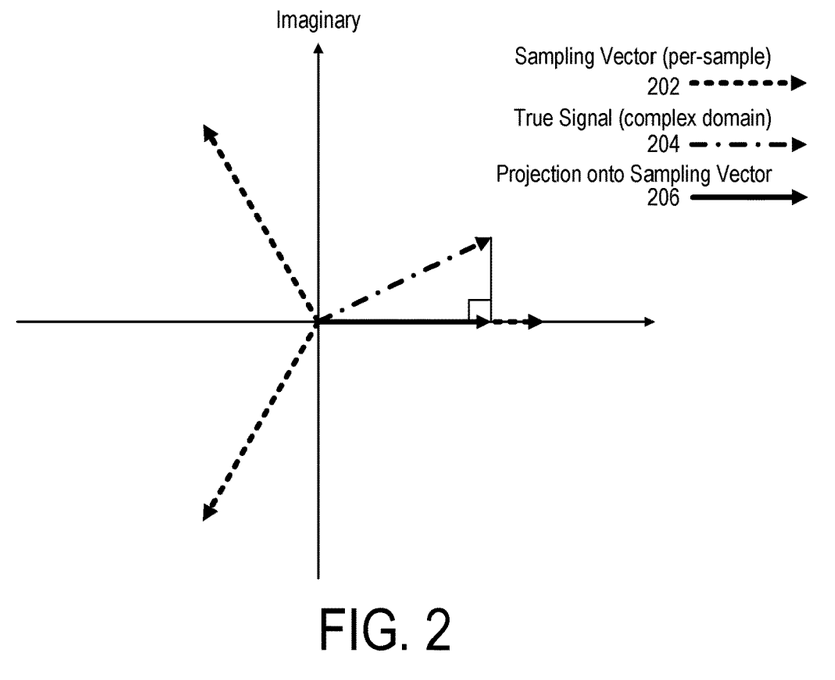
FIG. 2 shows an example Argand diagram representing phases and amplitudes of samples captured by a time-of-flight depth camera with a light source having no temperature dependence.

As mentioned above, the power of light emitted from the light source of the camera is modulated by a periodic waveform. The light source may be modulated at a plurality of frequencies per depth image frame, and depth values may be determined at a plurality of phase steps for each modulation frequency. FIG. 2 shows an example Argand diagram 200 representing phases and amplitudes of samples captured by a time-of-flight depth camera with a light source having no temperature dependence. In this example, the three phase samples are sampled with a same intrinsic correlation waveform shape, but shifted by 120 degrees by changing the phase relationship between the light-source modulation waveform and the sensor reference waveform. From the point of view of the fundamental frequency of the correlation waveform, each phase sample may be regarded as being a projection 202 of the true signal 204 projected onto a sampling vector 206 representing the effective phase and amplitude of the phase sample. As mentioned above, prior methods have calculated the phase of each frequency by calculating the Discrete Fourier Transform (DFT) bin corresponding to the fundamental frequency of the three phase samples, as represented by the following equation:

$$c = \left[1 \ e^{\frac{-2\pi}{3}} \ e^{\frac{-4\pi}{3}}\right] x \tag{1}$$

where $c \in \mathbb{C}$ is the complex depth measurement and $x \in \mathbb{R}^3$ are the phase steps. The complex depth measurement encodes the amplitude of the modulated illumination backscattered from the scene and measured by the sensor in the modulus, and the Time-of-Flight induced phase offset in the complex argument. The phase offset for each frequency may be calibrated so as to enable the calculation of depth without an unknown offset in phase due to the electro-optical properties of the illumination and sensor.

Figure 3:
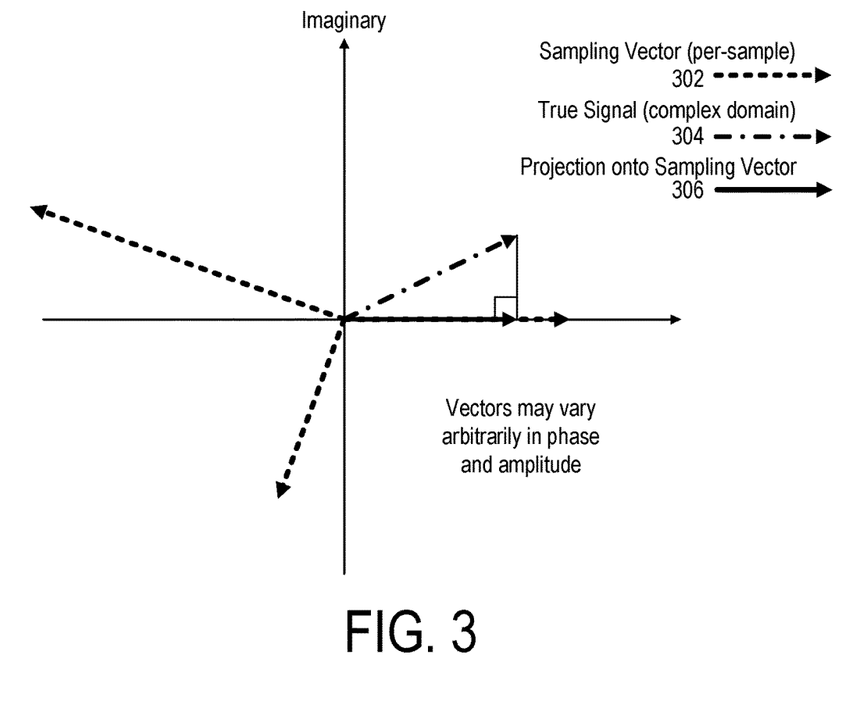
FIG. 3 shows an example Argand diagram representing phases and amplitudes of samples captured by a time-of-flight depth with a light source that exhibits temperature dependence.

In the example of FIG. 2, it is assumed that each vector is equally spaced, at 0 degrees, 120 degrees, and 240 degrees, representing the phase angle of the emitted light, and that each vector is of equal length, representing the amount of light emitted for that particular phase sample. However, in reality, due to the previously-mentioned temperature dependency of the laser light source, the vectors may actually be shifted in angle and vary in length, as phase angle and amplitude of the emitted light changes as a function of temperature. FIG. 3 shows an example Argand diagram 300 representing phases and amplitudes of samples captured by a time-of-flight depth camera with a light source having temperature dependence, and depicts example vectors that represent phase and amplitude of three phase samples affected by temperature changes. There is also a temperature dependence of the imaging sensor, although it is normally dominated by the light source.

The terms "effective phase" and "effective amplitude" may be used to refer to the phase and amplitude of the light source as it would be measured by the sensor itself under ideal conditions for each individual phase-step. In some embodiments, the effective phase and amplitude of each phase step is determined by performing a phase sweep, where the phase relationship of the sensor reference and illumination modulation waveforms is advanced each frame. Once sufficient samples over at least 360 degrees of phase step advance have been collected, a DFT may be performed for each integration over the collected frames and the effective phase and amplitude of each individual phase-step may be determined. In comparison, the standard approach performs a DFT over different phase-steps of the same frequency within a frame, rather than for each integration (corresponding to a specific phase step) over multiple frames. The disclosed phase sweep method allows measurement of the change in phase and amplitude behavior as a function of phase-step order, which may not be achieved by the standard approach.

Changes in effective phase and amplitude as a function of temperature may result in the negative fundamental frequency of the correlation waveform aliasing onto the fundamental, resulting in a two-cycle linearity error. Existing solutions may model the effective phase and/or amplitude of each complex depth measurement as a whole and correct for any fixed phase offsets or scale, but do not model the individual phase steps and their resultant impact on range-linearity.

Accordingly, rather than calculating a DFT bin, the examples disclosed herein calculate a complex phasor using a linear inverse function based upon estimated phase and amplitude values. The disclosed examples allow phase and amplitude to vary arbitrarily while correcting for errors caused by temperature changes.

To apply the complex phasor approach as disclosed herein to real time time-of-flight depth measurements, the phase and amplitude of a light source as a function of temperature may be modeled prior to run-time, for example, using data obtained from a population of light sources. An example modeling process is described in more detail below. The resulting temperature model may then be applied at run-time to help calculate the complex phasor per phase step, thereby correcting for the effect of light source temperature on depth measurements.

Figure 4:
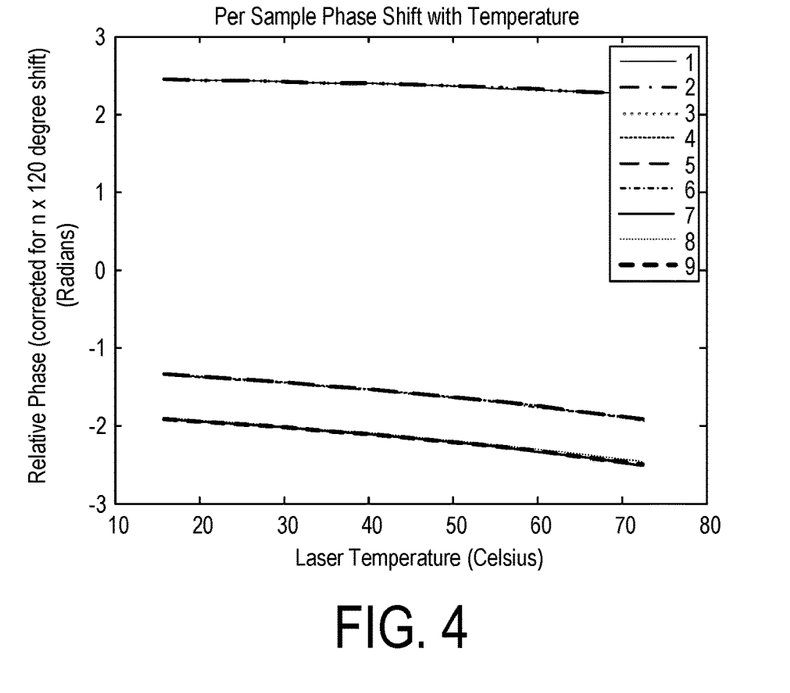
FIG. 4 shows a plot of phase shift as a function of light source temperature for nine example phase samples.
Figure 5:
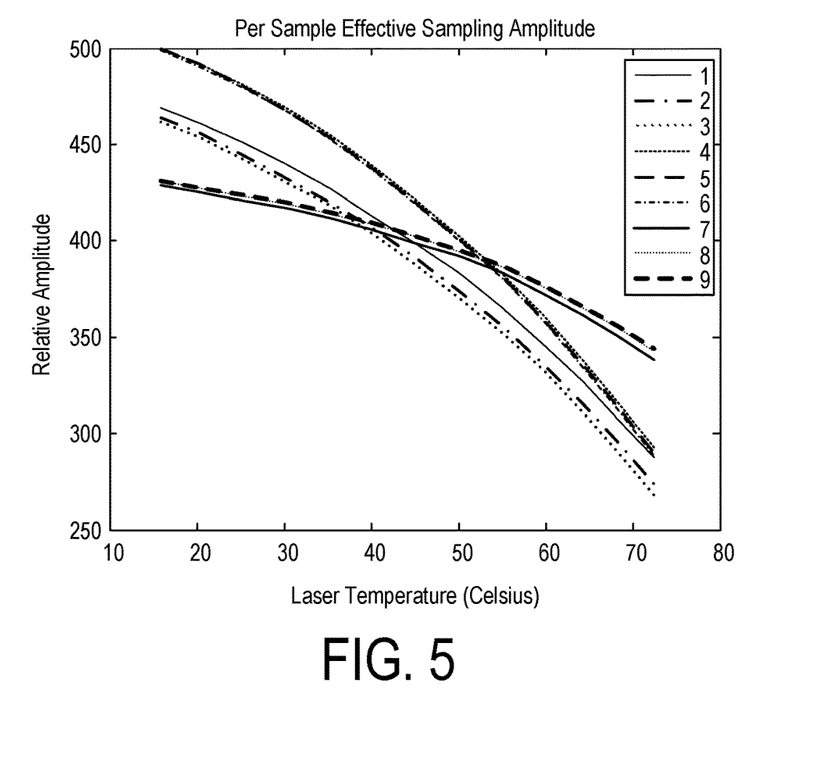
FIG. 5 shows a plot of amplitude as a function of light source temperature for nine example phase samples.

FIG. 4 shows a plot 400 of phase shift per sample as a function of temperature for nine example samples for an example light source, where samples 1, 2, and 3 correspond to phase samples at a first modulation frequency, samples 4, 5, and 6 correspond to phase samples at a second modulation frequency, and samples 7, 8, and 9 correspond to phase samples at a third modulation frequency. FIG. 5 shows a plot 500 of amplitude versus temperature for the same samples 1-9. As can be seen, the phase and amplitude each vary as a function of light source temperature for the different modulation frequencies. Further, each phase sample within a modulation frequency also vary based upon light source temperature. Thus, temperature calibration approaches that apply a same calibration to each phase sample and/or each frequency may encounter linearity or phase unwrapping errors. In contrast, the linear inverse examples disclosed herein may avoid such errors.

Figure 6:
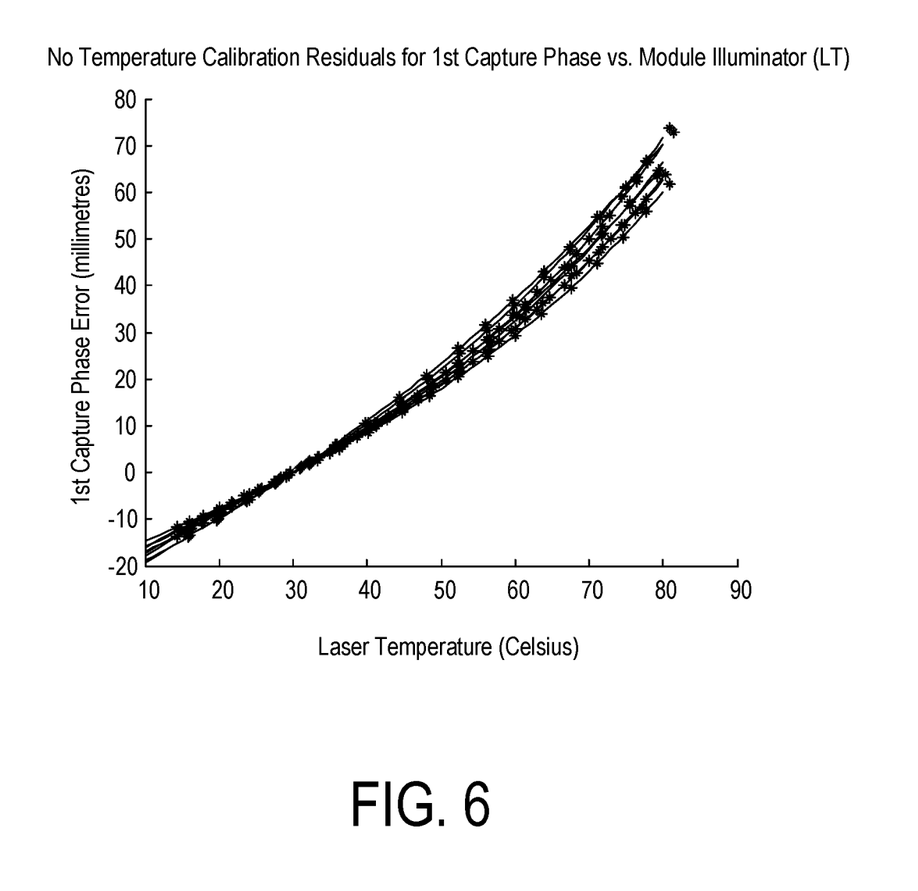
FIG. 6 shows a series of polynomial curves fit to data representing phase error as a function of light source temperature for a selected phase sample across a population of depth sensors.

The curves of FIGS. 4 and 5 may each be modeled by polynomials such as cubic polynomials, or other suitable functions, to form a predetermined temperature calibration model. To determine the temperature calibration model, temperature dependence data for each phase sample and each modulation frequency may be collected over a sample population of light sources using phase sweeps of each integration, and each temperature dependence curve for each phase sample at each frequency may be fit to a polynomial function or other suitable function. FIG. 6 shows a plot depicting a plurality of polynomial functions fit to phase error v. temperature data across a population of light sources for a first phase sample at a selected modulation frequency, given a known target distance. Similar data may be obtained and fit for other phase samples and other modulation frequencies. As can be seen in this figure, phase error and variation between the samples across the population increase with increasing temperature. From such data, a mean population temperature model (the previously-referenced predetermined temperature calibration model) may be generated from the plurality of fitted polynomial functions to calibrate the depth camera and correct for the temperature dependence of the light source when computing depth from image sensor data.

Figure 7:
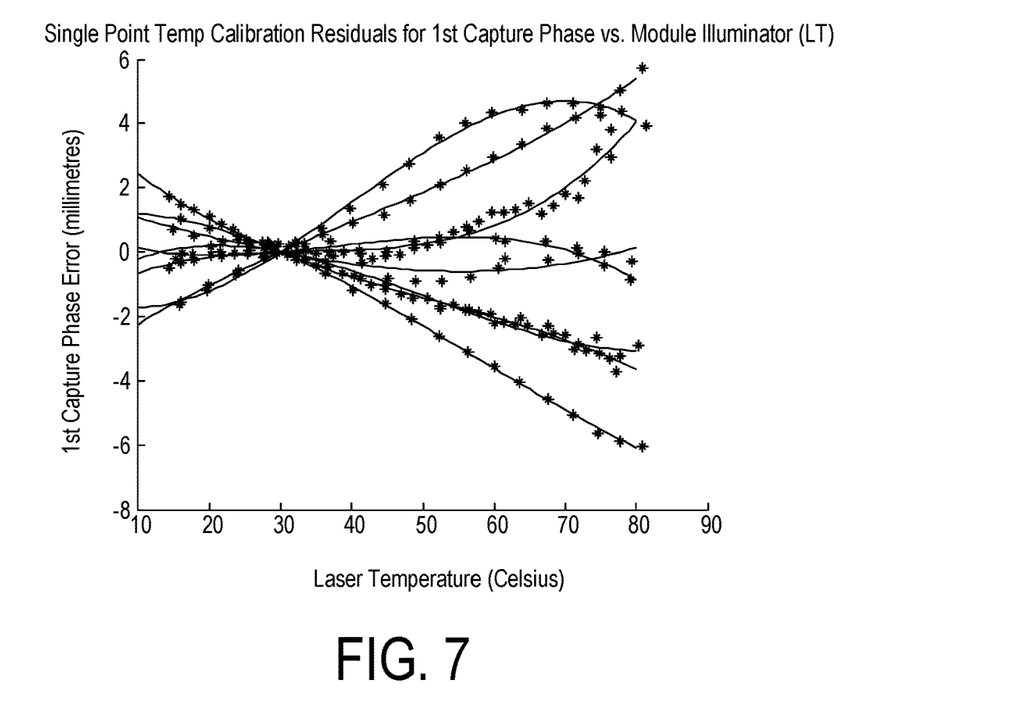
FIG. 7 shows residual phase errors versus temperature for a selected phase sample across a population of depth sensors when depth is determined using a linear inverse method with a single temperature point calibration.

FIG. 7 shows residual phase error versus light source temperature across the example population of depth sensors of FIG. 6, for a first phase step at a selected modulation frequency, using a single-point temperature calibration with a linear inverse phase and amplitude computation. The examples shown here are calibrated at approximately 30° C. As can be seen, the phase errors are much smaller compared to those of FIG. 6. However, higher temperatures result in somewhat higher variance compared to lower temperatures. Further, as mentioned above, the plotted polynomial functions of FIG. 6 diverge as temperature increases. As such, thus the mean temperature model may not accurately fit the population of depth sensors over an entire range of operating temperatures to a desired degree for some applications when using a single point calibration.

Figure 8:
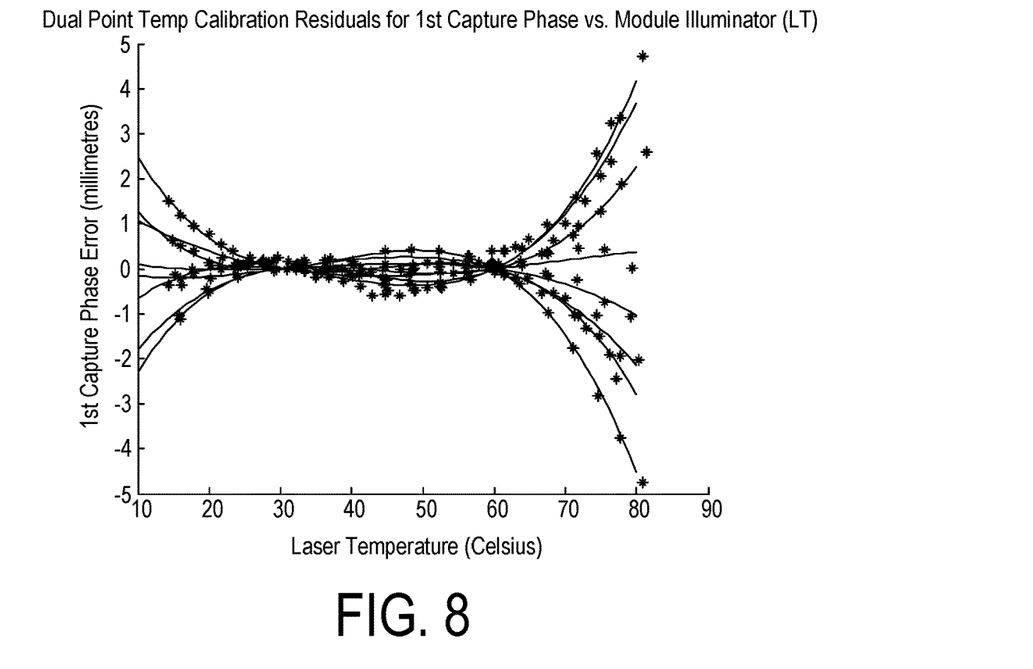
FIG. 8 shows residual phase errors versus temperature for a selected phase sample across a population of depth sensors when depth is determined using a linear inverse method with a dual-point temperature calibration.

Thus, in some examples, the mean temperature model may be adjusted on a per-unit basis using a dual-point temperature calibration and known population variation. In such examples, instead of using a generic population calibration at a fixed temperature, the fitted polynomial functions may be further constrained by a second calibration temperature. To do so, measurements taken at the second calibration temperature may be used to distort the polynomial functions (or other suitable functions) to match the measurements at both temperatures. As an example, a correction basis vector as determined from Principal Component Analysis may be applied to the polynomial coefficients to account for variation in the polynomials or other functions for the population. FIG. 8 shows residual phase errors versus temperature after applying an example dual-point temperature calibration across the example population of depth sensors. The second calibration temperature used for these examples is approximately 60° C. As can be seen, the error for the dual-point temperature calibration may be within millimeters over a relatively wide temperature range.

After the temperature dependence of the phase and amplitude of a population of light sources has been modeled, the model may be applied during runtime using a linear inverse approach. One example parameterization suitable for both phase and amplitude in such an approach is as follows.

$$f(t_{laser}, t_{sensor}) = d_0 + d_1 t_{sensor} + d_2 t_{laser} + d_3 t_{laser}^2 + d_4 t_{laser}^3 \quad (2)$$

This function assumes two temperature sensors in a depth sensing system, one configured to sense a temperature of the light source ($t_{laser}$), and one configured to sense a temperature of the image sensor ($t_{sensor}$). In other examples, the term for the image sensor temperature may be omitted. Further, in some examples, an additional spatial correction may be applied in a depth data processing pipeline to account for the impact of sensor temperature on the complex phasor calculations, as described below. The above parameterization further may comprise separate coefficients for each of plural light source temperatures, in examples in which a depth sensing system includes more than one light source temperature sensor. Although the above example equation (2) is a polynomial function, it will be understood that any other suitable function(s) may be used.

The temperature sensors may be read at any frequency, for example for every integration/phase step, or once per modulation frequency or once per frame or at any other rate. In some cases it may be read only once during operation.

Continuing, for each frequency, a complex phasor c may be calculated via a linear inverse function. One example calculation using a Moore-Penrose pseudo-inverse function is as follows.

$$c = [1, i] R (H^T H)^{-1} H^T \quad (3)$$

$$\text{where } H = \begin{bmatrix} \alpha_0 \cos(\theta_0) & \alpha_1 \cos(\theta_1) & \alpha_2 \cos(\theta_2) \\ \alpha_0 \sin(\theta_0) & \alpha_1 \sin(\theta_1) & \alpha_2 \sin(\theta_2) \end{bmatrix} \quad (4)$$

$$\text{and where } \alpha_k = f_{k, amplitude}(t_{laser}, t_{sensor}), \quad (5)$$

$$\theta_k = f_{k, phase}(t_{laser}, t_{sensor}), \quad (6)$$

$x \in \mathbb{R}^3$ are the raw captures, and $R \in \mathbb{R}^{2 \times 2}$ is a rotation matrix encoding fixed spatial phase corrections. As shown the complex phasor calculation may include all phase steps for that frequency (three in this example).

In some embodiments, the phase relationship between the sensor reference and illumination modulation waveforms for each integration changes from frame to frame. In this case, a corresponding offset is applied to the phase model for each phase step to correct for the change. This allows correct range measurements to be produced, despite the change in the phase relationship. In some embodiments, a system may be continuously performing a phase sweep, where the phase relationship of each integration is advanced every frame; as a result, the systematic bias due to correlation waveform harmonic aliasing may be reduced. In some embodiments, this is combined with temporal averaging techniques.

Further, in some embodiments, the phase steps for each frequency are not equally spaced around 360 degrees (as opposed to the standard approach, which is to use equispaced phase steps). In some embodiments this is combined with temporal averaging in order to reduce the negative impact of any correlation waveform harmonic aliasing on range linearity.

In some embodiments, one or more cameras have phase sweeps performed at multiple temperatures so as to determine the effective phase and amplitude of each integration or phase step, collecting data similar or equivalent to FIG. 4 and FIG. 5 for each camera, providing a corpus of camera temperature data. In some embodiments, a corpus temperature model is created by fitting polynomial curves to the combined phase and amplitude data. In a different embodiment, polynomial curves are fit to the phase/amplitude versus temperature data for each integration for each camera.

Further, in some embodiments, a single point temperature calibration for a specific camera is performed by performing a phase sweep of all the modulation frequencies at a known or controlled temperature using a target of known properties, such as a flat wall. Another potential target configuration is retroreflector or mirror at a known distance with a diffuser over the imaging lens to simulate imaging an object at constant radial distance. The corpus temperature model for effective phase is adjusted by applying an offset or mathematical transformation such that the model for each integration intersects the true value at the known or measured calibration temperature. In the case of a polynomial model, some embodiments may comprise adjusting the constant term of the polynomial so that this condition holds. This adjusted model is then used during operation of the camera in order to calculate the effective phase of each integration/phase-step. The same or a similar transformation is performed to the corpus temperature model for effective amplitude so that the measured effective amplitude at the calibration temperature intersects the adjusted model for each integration. In the case of a polynomial model, some embodiments may comprise scaling the polynomial such that it intersects at the calibration temperature.

In some embodiments, additional calibrations are performed at different temperatures. The adjusted corpus temperature models for effective phase and amplitude are mathematically transformed in such a way that the adjusted model intersects all measurements of the effective phase and amplitude. In some embodiments using two temperature calibration, this is achieved by adding a linear correction factor to the model such that the adjusted model intersects both the first and second effective phase and amplitude measurements. In other embodiments, this is implemented by creating orthogonal basis vectors over the coefficients of the polynomial model and performing weighted addition to the adjusted corpus temperature models so that adjusted model intersects all measurements of the effective phase and amplitude.

In some embodiments, the orthogonal basis vectors for effective phase are generated by transforming the polynomial model fitted to the corpus temperature data for each integration of each camera in the corpus such that the effective phase of each integration for each camera in the corpus intersects zero at the calibration temperature of the specific camera to be calibrated. In some embodiments, this is achieved by adding a constant offset to the fitted polynomial model. Principal components analysis is performed in order to generate the first principal component of variation in the corpus for the effective phase of each integration, given that the calibration temperature effective phase is pinned at zero. When performing an additional temperature calibration at a second temperature, the basis vector corresponding to the first principal component is used to correct the adjusted effective phase model through weighted addition such that the adjusted model intersects both the first and the second measurements. In another embodiment, a third temperature calibration step is performed and the basis vector corresponding to the second principal component is used to adjust the effective phase model such that it intersects all of the temperature calibration measurements of effective phase. In another embodiment, this is extended to an arbitrary number of temperature measurements.

Further, in some embodiments, multiple calibrations are performed at different temperatures for each camera to be calibrated using a phase sweep. A model is directly fit to the measured effective amplitude and phase over temperature. This is used during run-time in order to perform temperature correction. In some embodiments, this may be a linear fit over measured laser temperature for the phase and amplitude of each integration. In another embodiment, the fitting operation may use the statistics of the corpus of camera temperature data as a statistical prior and solve a maximum-a-posteriori estimation problem in order to determine an optimal model to apply at run-time. In some embodiments, this statistical prior may be a multivariate Gaussian distribution describing the coefficients of polynomials fit to the effective phase and effective amplitude of each integration over the corpus of camera temperature data. In some embodiments the same (or similar) approach is applied to the effective amplitude.

In some embodiments, the fitted model may not exactly intersect the measured effective phase and amplitude.

Further, in some embodiments, fixed spatial phase corrections for each pixel are calculated from the known target and used to calculate a phase correction to be applied at run-time after calibration (referred to as R in equation (3) above.

It will be understood that there may be other mathematically similar or equivalent approaches that are within the scope of this disclosure, including where the calibration temperature is stored and the corpus temperature model is used to estimate the change in effective phase and amplitude versus the effective phase and amplitude at calibration without creating a modified temperature calibration model for each camera. In other embodiments, the spatial phase calibration is adjusted using the corpus temperature model so that it is represented as if it were at a specified temperature, for example zero Celsius.

Figure 9:
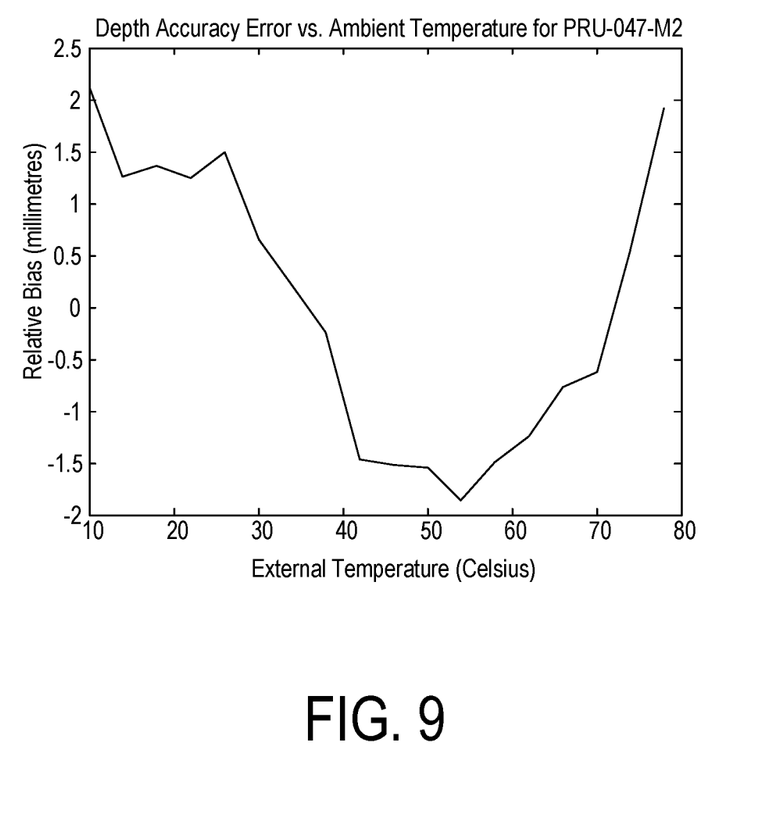
FIG. 9 shows a plot depicting depth accuracy as a function of ambient temperature using a linear inverse method and a dual-point temperature calibration.

FIG. 9 shows example real-world performance of a time-of-flight depth sensing system after applying a linear inverse method utilizing the dual-point temperature calibration illustrated in FIG. 8. As shown, error within approximately ±2 mm range may be achieved over a range of temperatures.

As mentioned above, image sensor performance also may exhibit some temperature dependence. Even with an ideal light source kept at a constant temperature, changes in sensor temperature may cause spatial sensor performance variations, thereby affecting the complex phasor measurements. For example, at each phase step, an image may be integrated by modulating the image sensor using a delay-locked loop (DLL) in the image sensor, which deliberately introduces a phase-delay horizontally across pixels of the image sensor. Each pixel in the image sensor has a sampling phasor that may vary in phase. Spatial variation in the image sensor thus may be a function of the sensor signal being delayed from pixel to pixel, horizontally (left-to-right with regard to pixels in the sensor) due to the DLL and vertically (top-to-bottom) due to the pixel clock driver(s) combined with transmission line effects down the clock lines in the imaging array. Such properties may vary with changes in temperature, leading to depth measurement errors.

Accordingly, a spatial temperature correction based on sensor temperature may be applied in addition to temperature correction based on light source temperature. In some examples, a horizontal correction vector may be applied to each row of pixels in the image sensor, and a vertical correction vector may be applied to each column of pixels. The horizontal correction vector and vertical correction vector may be determined based on population data relating to phase error on the sensor as a function of temperature. As an example, the vectors may be computed as follows.

Horizontal correction vector=$(t_{sensor}-t_{calibration})h_c$

Vertical correction Vector=$(t_{sensor}-t_{calibration})v_c$ where the basis vector, $h_c$, used for the horizontal correction vector is a linear function of column number, and the basis vector, $v_c$, used for the vertical correction vector is a quartic function of row number. The disclosed examples are not restricted to basis vectors that can be modelled as polynomials; in some embodiments the entire basis vector is explicitly stored or a different type of model is used.

In some embodiments, the spatial temperature basis vectors are generated by taking measurements of the effective phase of one or more cameras at two different temperatures, performing a subtraction of the effective phase at one temperature from the other and averaging over all the cameras. The spatial correction factor per degree Celsius is determined by dividing the effective phase difference by the difference between the two temperatures. In other embodiments, more temperatures are used. In some embodiments, the horizontal correction vector $h_c$ and the vertical correction vector $v_c$ are determined by weighted least squares linear fits in the horizontal and vertical directions to the raw effective phase spatial correction factor per degree Celsius value, where the weight is the measured mean complex modulus of the signal. In other embodiments, any approach known to those expert in the field may be used to fit the correction vectors to the available data.

Figure 10:
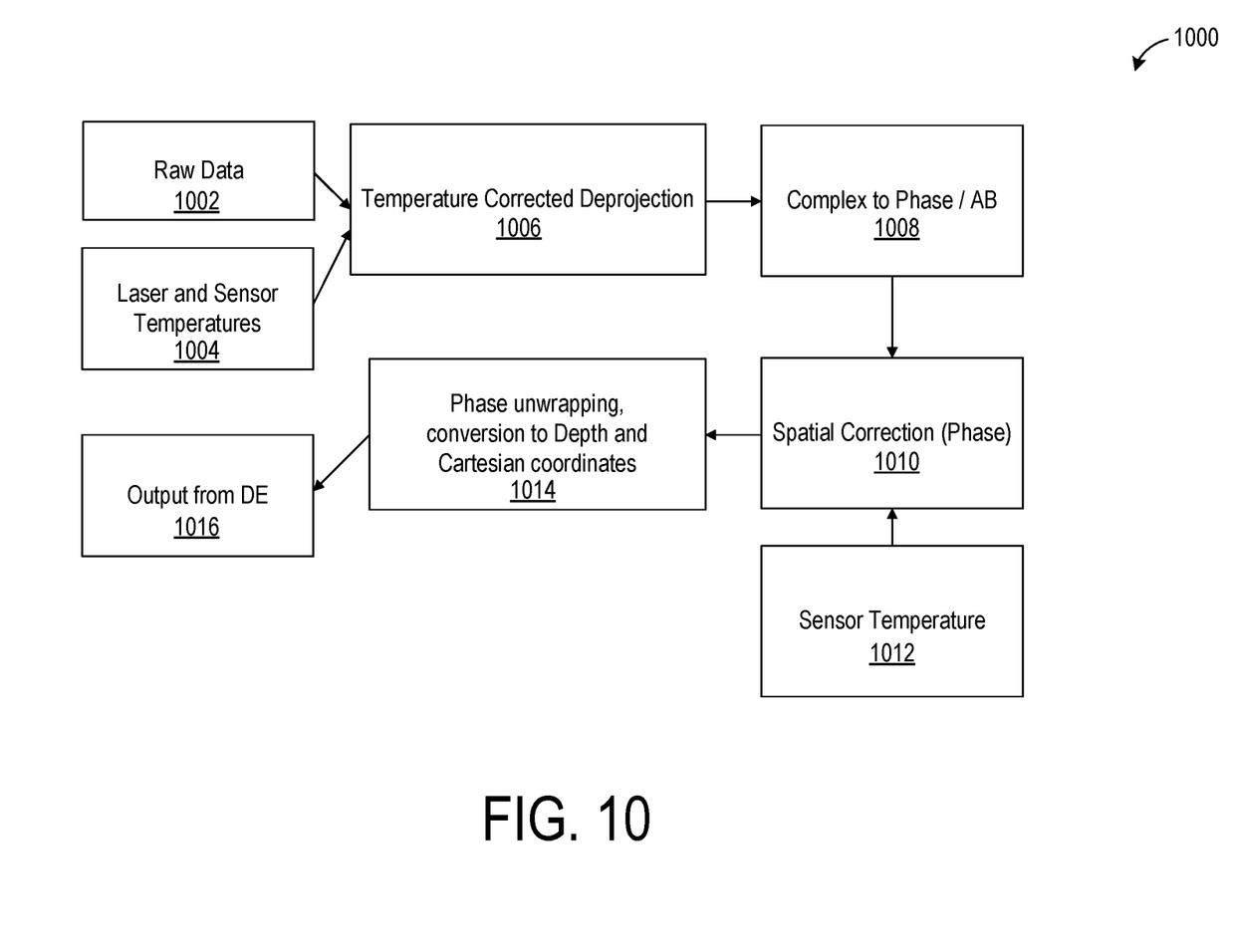
FIG. 10 shows block diagram depicting data flow within a time-of-flight depth sensing system.

FIG. 10 shows a block diagram of an example depth engine 1000 within a time-of-flight depth camera that may implement the example temperature corrections described above. Raw data 1002 and laser and sensor temperatures 1004 are provided as input to temperature corrected deprojection block 1006, which determines complex phasors using a linear inverse-based approach while compensating for light source temperature dependence (and potentially image sensor temperature dependence), as described above. Continuing, at block 1008, phase and active brightness (AB) (e.g. amplitude) are determined from the complex phasor. Next, spatial correction for temperature dependence of the image sensor may be performed at 1010 with input from an image sensor temperature sensor at block 1012, as described above.

Next, the phase unwrapping block 1014 takes the determined phase measurements and performs phase unwrapping, which helps disambiguate between possible distances using the plural phase samples at each modulation frequency. Performing spatial correction prior to phase unwrapping may help to prevent de-aliasing errors or linearity errors that may be introduced at the phase unwrapping stage, although in some examples, spatial correction may occur after phase unwrapping. At 1018, the phase and amplitude measurements may then be converted to depth, x-y-z measurements, and/or reflectivity, which may then be output from the depth engine, at 1020. Optionally, at any stage of the pipeline filters may be applied, which may include processing filters, image filters, box filters, and/or other suitable filters. A subset of these outputs may be provided or additional outputs, such as the sum of the amplitudes of the individual modulation frequencies measured by the sensor.

Figure 11:
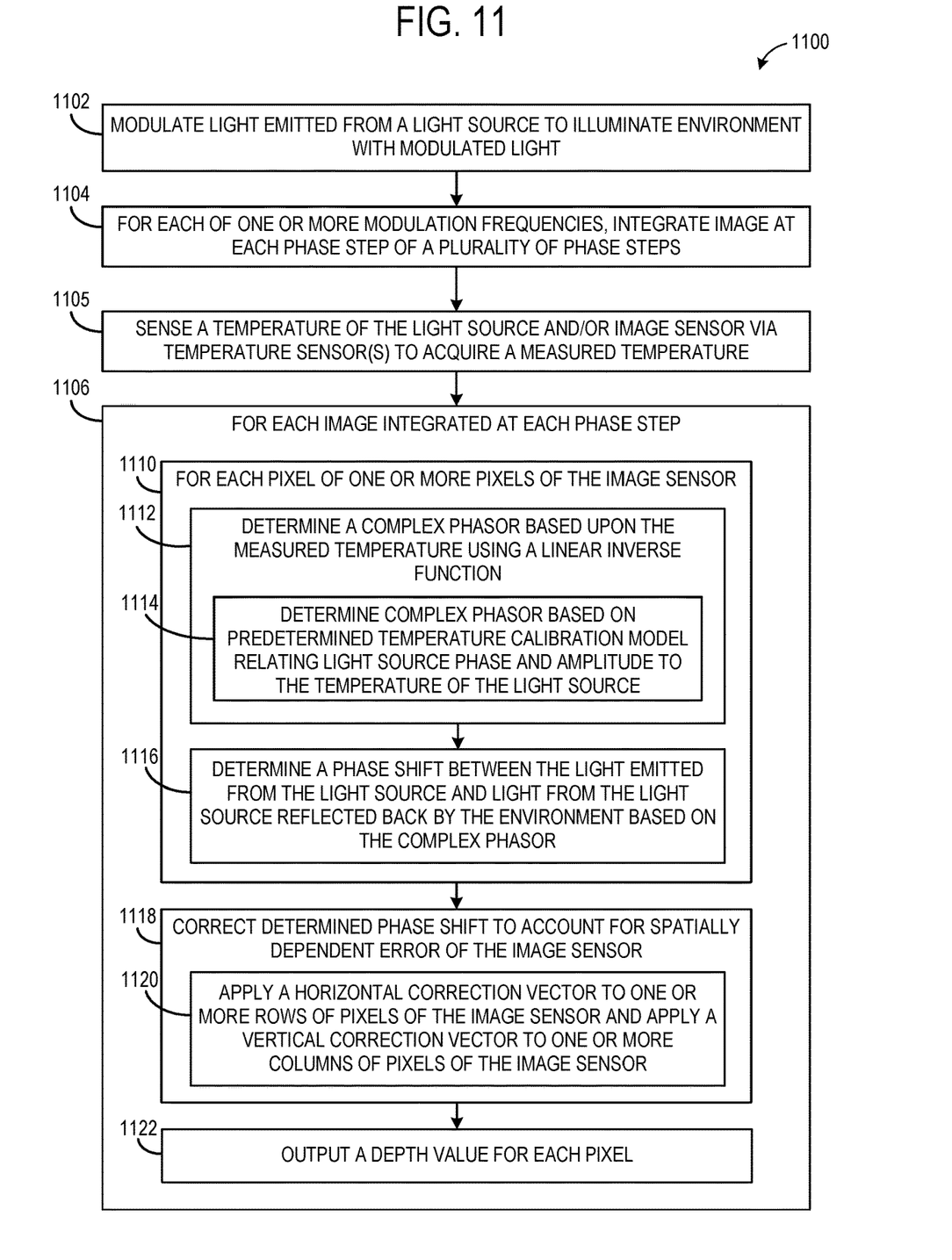
FIG. 11 shows an example method of operating a time-of-flight system.

FIG. 11 shows an example method 1100 of correcting for time-of-flight depth measurements. Method 1100 includes, at 1102, modulating light emitted from a light source to illuminate an environment with modulated light. Method 1100 further includes, at 1104, for each of one or more modulation frequencies, integrating an image at each phase step of a plurality of phase steps, and, at 1105, sensing a temperature of the light source and/or image sensor via one or more temperature sensor(s) to acquire a measured temperature.

For each image integrated at each phase step, at 1106, and for each pixel of one or more pixels of the image sensor, at 1110, method 1100 includes, at 1112, determining a complex phasor based upon the temperature of the light source and/or the image sensor using a linear inverse function. The complex phasor may be determined based on a predetermined temperature calibration model relating light source phase and amplitude to the temperature of the light source, at 1114. The predetermined temperature calibration model may be based on phase and amplitude behavior as a function of light source temperature for a population of devices that was determined during factory calibration/manufacturing. In some examples, the predetermined temperature calibration model may be based on calibration at two or more different temperature points, while in other examples the calibration model may be based upon a single calibration temperature point. Next, for each pixel, a phase shift is determined between the light emitted from the light source and light from the light source reflected back by the environment based on the complex phasor, at 1116. As described above, determining phase shifts based on a complex phasor using a linear inverse function may allow the use of arbitrary phase steps and frequencies. In some examples, phase steps that are not equally spaced may be deliberately used and changed over time to help improve accuracy.

Method 1100 further includes, at 1118, correcting the determined phase shift to account for a spatially dependent error of the image sensor. This may be done for example by, at 1120, applying a horizontal correction vector to one or more rows of pixels of the image sensor and applying a vertical correction vector to one or more columns of pixels of the image sensor. Then, method 1100 includes, at 1122, outputting a depth value for each pixel. The resulting depth value therefore takes into account temperature dependencies of the light source and of the image sensor, which may be more accurate compared to methods that determine depth values using per-pixel linear corrections.

Figure 12:
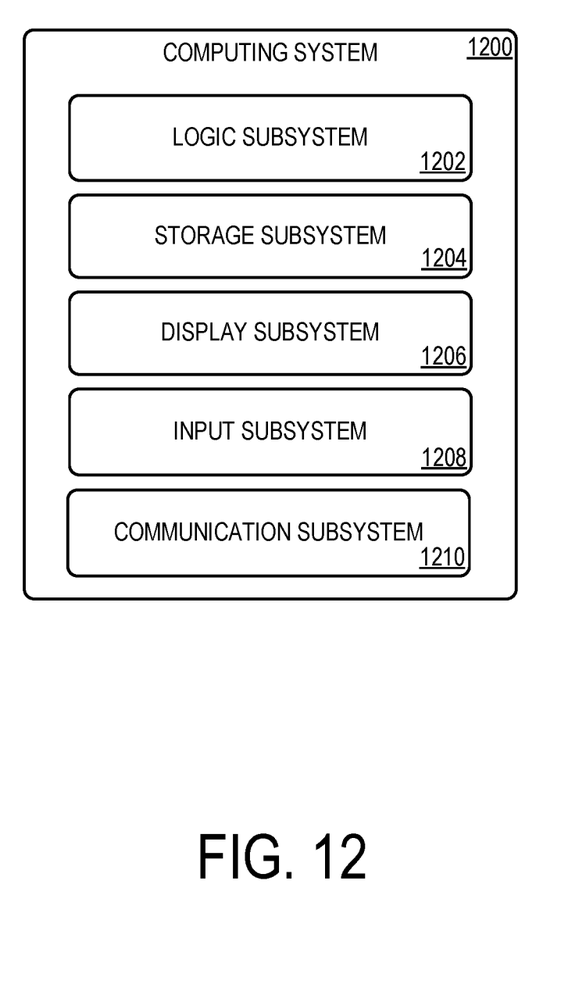
FIG. 12 shows a block diagram of an example computing system.

FIG. 12 schematically shows a non-limiting embodiment of a computing system 1200 that can enact one or more of the methods and processes described above. Computing system 1200 is shown in simplified form. Computing system 1200 may take the form of one or more personal computers, server computers, tablet computers, home-entertainment computers, network computing devices, gaming devices, mobile computing devices, mobile communication devices (e.g., smart phone), and/or other computing devices. Computing system 1200 may be representative of depth camera 10, for example.

Computing system 1200 includes a logic subsystem 1202 and a storage subsystem 1204. Computing system 1200 may optionally include a display subsystem 1206, input subsystem 1208, communication subsystem 1210, and/or other components not shown in FIG. 12.

Logic subsystem 1202 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 1202 may include one or more processors configured to execute software instructions. Additionally or alternatively, logic subsystem 1202 may include one or more hardware or firmware logic machines configured to execute hardware or firmware instructions. Processors of logic subsystem 1202 may be single-core or multi-core, and the instructions executed thereon may be configured for sequential, parallel, and/or distributed processing. Individual components of logic subsystem 1202 optionally may be distributed among two or more separate devices, which may be remotely located and/or configured for coordinated processing. Aspects of logic subsystem 1202 may be virtualized and executed by remotely accessible, networked computing devices configured in a cloud-computing configuration.

Storage subsystem 1204 includes one or more physical devices configured to hold instructions executable by logic subsystem 1202 to implement the methods and processes described herein. When such methods and processes are implemented, the state of storage machine ?? may be transformed—e.g., to hold different data.

Storage subsystem 1204 may include removable and/or built-in devices. Storage subsystem 1204 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1204 may include volatile, nonvolatile, dynamic, static, read/write, read-only, random-access, sequential-access, location-addressable, file-addressable, and/or content-addressable devices.

It will be appreciated that storage subsystem 1204 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1202 and storage subsystem 1204 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "engine" may be used to describe an aspect of computing system 1200 implemented to perform a particular function. In some cases, an engine may be instantiated via logic subsystem 1202 executing instructions held by storage subsystem 1204. It will be understood that different engines may be instantiated from the same application, service, code block, object, library, routine, API, function, etc. Likewise, the same module, program, and/or engine may be instantiated by different applications, services, code blocks, objects, routines, APIs, functions, etc. The term "engine" may encompass individual or groups of executable files, data files, libraries, drivers, scripts, database records, etc.

When included, display subsystem 1206 may be used to present a visual representation of data held by storage subsystem 1204. This visual representation may take the form of a graphical user interface (GUI). As the herein described methods and processes change the data held by the storage machine, and thus transform the state of the storage machine, the state of display subsystem 1206 may likewise be transformed to visually represent changes in the underlying data. Display subsystem 1206 may include one or more display devices utilizing virtually any type of technology. Such display devices may be combined with logic subsystem 1202 and/or storage subsystem 1204 in a shared enclosure, or such display devices may be peripheral display devices.

When included, input subsystem 1208 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1210 may be configured to communicatively couple computing system 1200 with one or more other computing devices. Communication subsystem 1210 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1200 to send and/or receive messages to and/or from other devices via a network such as the Internet.

Another example provides a time-of-flight depth imaging system comprising a modulated time-of-flight image sensor, a light source, one or more temperature sensors configured to sense a temperature of the light source and/or image sensor, a processor, and a storage device comprising instructions executable by the processor to modulate light emitted from the light source to illuminate an environment with modulated light, for each of one or more modulation frequencies, integrate an image at each phase step of a plurality of phase steps, sense the temperature of the light source and/or image sensor via the one or more temperature sensors to acquire a measured temperature, and for each pixel of one or more pixels of the image sensor, determine a complex phasor based upon the measured temperature using a linear inverse function for each modulation frequency, determine a phase shift between the light emitted from the light source and light from the light source reflected back by the environment based on the complex phasor, and output a depth value for the pixel based upon the phase shift. The complex phasor may be additionally or alternatively determined based on a predetermined temperature calibration model relating an effective light source phase and amplitude as sensed by the image sensor for each individual phase step to the temperature sensed of the light source and/or the image sensor. The predetermined temperature calibration model for an individual camera may be additionally or alternatively determined based on calibration at two or more temperatures. The predetermined temperature calibration model may be additionally or alternatively determined based on Principal Components Analysis of a population of time-of-flight depth imaging devices. The predetermined temperature calibration model for an effective phase of each phase-step and the predetermined temperature calibration model for an effective amplitude of each phase-step may additionally or alternatively be a polynomial. The predetermined temperature model may be additionally or alternatively adjusted for each device based upon measurements of an effective phase and/or effective amplitude of each individual phase step using a phase sweep. The spacing between the phase steps may additionally or alternatively be non-uniform over 360 degrees. Additionally or alternatively, a phase relationship between a sensor reference waveform and a illumination modulation waveform for each integration may change between temporally adjacent frames. The instructions may additionally or alternatively be further executable to perform spatial temperature correction for each frequency. Where the temperature sensor is a first temperature sensor, the time-of-flight depth imaging system may additionally or alternatively include a second temperature sensor configured to sense a temperature of the image sensor, and wherein the instructions are further executable to correct the determined phase shift to account for spatially dependent error of the image sensor by applying a horizontal correction vector to one or more rows of pixels of the image sensor and applying a vertical correction vector to one or more columns of pixels of the image sensor, the horizontal correction vector and the vertical correction vector being based on the temperature of the image sensor.

Another example provides, on a time-of-flight depth imaging system comprising an image sensor, a light source, and a temperature sensor configured to sense a temperature of the light source and/or image sensor, a method comprising, modulating light emitted from the light source to illuminate an environment with modulated light, for each of one or more modulation frequencies, integrating an image at each phase step of a plurality of phase steps, and for each image integrated at each phase step, sensing a temperature of the light source and/or image sensor via the temperature sensor, and for each pixel of one or more pixels of the image sensor, determining a complex phasor based upon the temperature sensed using a linear inverse function for each modulation frequency, determining a phase shift between the light emitted from the light source and light from the light source reflected back by the environment based on the complex phasor, and outputting a depth value for the pixel. Determining the complex phasor may additionally or alternatively include determining the complex phasor based on a predetermined temperature calibration model relating light source effective phase and amplitude to the temperature of the light source. The predetermined temperature calibration model may additionally or alternatively be determined based on calibration at two or more temperatures. The predetermined temperature calibration model may additionally or alternatively be a polynomial. Additionally or alternatively, a phase relationship between a sensor reference waveform and a illumination modulation waveform for each integration may change between temporally adjacent frames. The method may additionally or alternatively include correcting the determined phase shift to account for a spatially dependent error of the image sensor for each image integrated at each phase step.

Another example provides a time-of-flight depth imaging system comprising a modulated time-of-flight image sensor, a light source, a first temperature sensor configured to sense a temperature of the light source, a second temperature sensor configured to sense a temperature of the image sensor, a processor, and a storage device comprising instructions executable by the processor to modulate light emitted from the light source to illuminate an environment with modulated light, for each of one or more modulation frequencies, integrate an image at each phase step of a plurality of phase steps, for each image integrated at each phase step, sense a temperature of the light source via the first temperature sensor, sense a temperature of the image sensor via the second temperature sensor, for each pixel of one or more pixels of the image sensor, determine a complex phasor based upon the temperature of the light source using a linear inverse function, and determine a phase shift between the light emitted from the light source and light from the light source reflected back by the environment based on the complex phasor, correct the determined phase shift to account for a spatially dependent error of the image sensor by applying a horizontal correction vector to one or more rows of pixels of the image sensor and applying a vertical correction vector to one or more columns of pixels of the image sensor, the horizontal correction vector and the vertical correction vector being based on the temperature of the image sensor, and output a depth value for each pixel. The horizontal correction vector and the vertical correction vector each may additionally or alternatively be based on phase error as a function of temperature of the image sensor. The horizontal correction vector may additionally or alternatively include a linear function of column number applied to each row of pixels in the image sensor. The vertical correction vector may additionally or alternatively include a quartic function as a function of row number applied to each column of pixels in the image sensor.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A time-of-flight depth imaging system comprising:
   a modulated time-of-flight image sensor;
   a light source;
   one or more temperature sensors configured to sense a temperature of the light source and/or image sensor;
   a processor; and
   a storage device comprising instructions executable by the processor to
      modulate light emitted from the light source to illuminate an environment with modulated light,
      for each of one or more modulation frequencies, integrate an image at each phase step of a plurality of phase steps and sense the temperature of the light source and/or image sensor via the one or more temperature sensors to acquire a measured temperature, and
      for each pixel of one or more pixels of the image sensor,
         determine a complex phasor based upon the measured temperature using a linear inverse function for each modulation frequency,
         determine a phase shift between the light emitted from the light source and light from the light source reflected back by the environment based on the complex phasor, and
         output a depth value for the pixel based upon the phase shift.

2. The time-of-flight depth imaging system of claim 1, wherein the complex phasor is determined based on a predetermined temperature calibration model relating an effective light source phase and amplitude as sensed by the image sensor for each individual phase step to the temperature sensed of the light source and/or the image sensor.

3. The time-of-flight depth imaging system of claim 2, wherein the predetermined temperature calibration model for an individual camera is determined based on calibration at two or more temperatures.

4. The time-of-flight depth imaging system of claim 3, wherein the predetermined temperature calibration model is determined based on Principal Components Analysis of a population of time-of-flight depth imaging devices.

5. The time-of-flight depth imaging system of claim 2, wherein the predetermined temperature calibration model for an effective phase of each phase-step and the predetermined temperature calibration model for an effective amplitude of each phase-step is a polynomial.

6. The time-of-flight depth imaging system of claim 2, wherein the predetermined temperature model is adjusted for each device based upon measurements of an effective phase and/or effective amplitude of each individual phase step using a phase sweep.

7. The time-of-flight depth imaging system of claim 2, wherein the spacing between the phase steps is non-uniform over 360 degrees.

8. The time-of-flight depth imaging system of claim 2, wherein a phase relationship between a sensor reference waveform and a illumination modulation waveform for each integration changes between temporally adjacent frames.

9. The time-of-flight depth imaging system of claim 1, wherein the instructions are further executable to perform spatial temperature correction for each frequency.

10. The time-of-flight depth imaging system of claim 9, wherein the temperature sensor is a first temperature sensor, and further comprising a second temperature sensor configured to sense a temperature of the image sensor, and wherein the instructions are further executable to correct the determined phase shift to account for spatially dependent error of the image sensor by applying a horizontal correction vector to one or more rows of pixels of the image sensor and applying a vertical correction vector to one or more columns of pixels of the image sensor, the horizontal correction vector and the vertical correction vector being based on the temperature of the image sensor.

11. On a time-of-flight depth imaging system comprising an image sensor, a light source, and a temperature sensor configured to sense a temperature of the light source and/or image sensor, a method comprising:
   modulating light emitted from the light source to illuminate an environment with modulated light;
   for each of one or more modulation frequencies, integrating an image at each phase step of a plurality of phase steps; and
   for each image integrated at each phase step,
      sensing a temperature of the light source and/or image sensor via the temperature sensor, and
      for each pixel of one or more pixels of the image sensor,
         determining a complex phasor based upon the temperature sensed using a linear inverse function for each modulation frequency,
         determining a phase shift between the light emitted from the light source and light from the light source reflected back by the environment based on the complex phasor, and
         outputting a depth value for the pixel.

12. The method of claim 11, wherein determining the complex phasor comprises determining the complex phasor based on a predetermined temperature calibration model relating light source effective phase and amplitude to the temperature of the light source.

13. The method of claim 12, wherein the predetermined temperature calibration model is determined based on calibration at two or more temperatures.

14. The method of claim 12, wherein the predetermined temperature calibration model is a polynomial.

15. The method of claim 11, wherein a phase relationship between a sensor reference waveform and an illumination modulation waveform for each integration changes between temporally adjacent frames.

16. The method of claim 11, further comprising correcting the determined phase shift to account for a spatially dependent error of the image sensor for each image integrated at each phase step.

17. A time-of-flight depth imaging system comprising:
   a modulated time-of-flight image sensor;
   a light source;
   a first temperature sensor configured to sense a temperature of the light source;
   a second temperature sensor configured to sense a temperature of the image sensor;
   a processor; and
   a storage device comprising instructions executable by the processor to:
      modulate light emitted from the light source to illuminate an environment with modulated light,
      for each of one or more modulation frequencies, integrate an image at each phase step of a plurality of phase steps,
      for each image integrated at each phase step,
         sense a temperature of the light source via the first temperature sensor, sense a temperature of the image sensor via the second temperature sensor, for each pixel of one or more pixels of the image sensor, determine a complex phasor based upon the temperature of the light source using a linear inverse function, and determine a phase shift between the light emitted from the light source and light from the light source reflected back by the environment based on the complex phasor, correct the determined phase shift to account for a spatially dependent error of the image sensor by applying a horizontal correction vector to one or more rows of pixels of the image sensor and applying a vertical correction vector to one or more columns of pixels of the image sensor, the horizontal correction vector and the vertical correction vector being based on the temperature of the image sensor, and output a depth value for each pixel.

18. The time-of-flight depth imaging system of claim 17, wherein the horizontal correction vector and the vertical correction vector each are based on phase error as a function of temperature of the image sensor.

19. The time-of-flight depth imaging system of claim 17, wherein the horizontal correction vector comprises a linear function of column number applied to each row of pixels in the image sensor.

20. The time-of-flight depth imaging system of claim 17, wherein the vertical correction vector comprises a quartic function as a function of row number applied to each column of pixels in the image sensor.

* * * * *